United States Patent [19]

Kunert

[11] Patent Number: 4,582,738
[45] Date of Patent: Apr. 15, 1986

[54] GLASS SHEET, PARTICULARLY A GLASS SHEET FOR USE WITH AUTOMOBILES, SAID SHEET FURNISHED WITH AN ADHESIVELY ATTACHED METAL EDGE STRIP

[75] Inventor: Heinz Kunert, Cologne, Fed. Rep. of Germany

[73] Assignee: Saint-Gobain Vitrage, Courbevoie, France

[21] Appl. No.: 615,149

[22] Filed: May 30, 1984

[30] Foreign Application Priority Data

Jun. 3, 1983 [DE] Fed. Rep. of Germany ....... 3320157

[51] Int. Cl.$^4$ .......................... B32B 7/04; B32B 7/12
[52] U.S. Cl. ........................................ 428/80; 428/81; 428/122; 428/157; 428/194
[58] Field of Search ..................... 428/80, 81, 83, 122, 428/156, 157, 164, 167, 172, 192, 194; 296/84 A, 92, 93

[56] References Cited

FOREIGN PATENT DOCUMENTS 76924 4/1983 European Pat. Off. ............ 428/122
79839 5/1983 European Pat. Off. ................... 122/

*Primary Examiner*—William J. Van Balen
*Attorney, Agent, or Firm*—Oblon, Fisher, Spivak, McClelland & Maier

[57] ABSTRACT

The invention relates to attachment of metal edge strips to a sliding glass sheet for an automobile, the function of the strips being to guide or hold said sheet. Edge strips are attached to a sliding glass sheet by means of an adhesive which has high adhesion to glass, such as an adhesive comprised of polyurethane with other components.

According to the invention, the adhesion of the adhesive to the edge strips is enhanced by furnishing the leg of the strip, which contacts the adhesive, with apertures, grooves, notches, channels and hollows. It has been found that the contact surface between the adhesive and the leg is at least twice as important as that between the adhesive and the glass.

17 Claims, 5 Drawing Figures

GLASS SHEET, PARTICULARLY A GLASS SHEET FOR USE WITH AUTOMOBILES, SAID SHEET FURNISHED WITH AN ADHESIVELY ATTACHED METAL EDGE STRIP

BACKGROUND OF THE INVENTION

1. Field of the Invention

The invention relates to a glass sheet provided with metal mounting means attached to its border by adhesive bonding. In particular, the present invention may be used in an automobile where the glass sheet has edge strips which are adhesively bonded thereto and which are used for holding and guiding the glass sheet in the body of the automobile. The more particular example of such a sheet is a sliding glass sheet for the window in a door of a vehicle.

2. Description of the Prior Art

There is an increasing trend toward the reduction of aerodynamic drag of automobiles. For this purpose, it is known to mount the automobile glass, particularly the lateral windows, in the body of the vehicle such that the exterior surface of the sheet is completely flush with the automobile body. As a consequence, it is no longer possible to hold the sheet at its edge surface in metal U-shape strips, which yield undesirable protuberances which increase aerodynamic drag. Instead, use is made of systems, for mounting the glass sheet in the body, which do not yield protuberances at the outer surface of the glass sheet. Among the possible systems, there has been devised a system of attachment by adhesive bonding, whereby all the metal parts necessary for proper operation of the glass element (e.g., profiled pieces for holding, guiding, etc.) are adhesively bonded directly to the surface of the glass facing the interior of the vehicle.

These are considerable problems associated with achieving a durable adhesive bond between a glass sheet and metal edge-strips. One difficulty frequently encountered is that, as a general rule, adhesive materials utilized for this purpose have a very different adhesion to the metal surface on the one hand and the glass surface on the other. Thus there are adhesives which are applied over an adhesive primer and have very strong adhesion to glass, while there are other adhesives which adhere extremely well to the metals employed. However, thus far there are no adhesives which are known to be ideally appropriate for this type of application, i.e., which adhere extremely strongly to both glass and metal surfaces.

With the above-mentioned motivation, it has been previously proposed (see, e.g., German Pat. No. 2,371,100) to coat the metal holding elements, which are to be adhesively bonded to the surface of the glass, with enamel or varnish. This will confer properties on the metal surface comparable to those of a glass surface. Than one may employ adhesives which have particularly good adhesion to glass.

SUMMARY OF THE INVENTION

An object of the present invention is to devise means which enable a durable adhesive bond between the metal elements and the glass sheet held in position by means of said metal elements. The bond thus produced must durably resist the forces which are exerted on the holding elements of an automobile window glass such as a sliding window.

In order to achieve this object, which allows the use of an adhesive material which adheres strongly to glass but only weakly to metal, there is proposed according to the invention, a glass sheet, particularly a glass sheet for an automobile window, which is furnished with a metal edge strip for holding or guiding said sheet in the body in a manner flush with said automobile body, which strip is adhesively bonded to the glass sheet by an adhesive material, wherein the area of the contact surface between the adhesive mass and the edge strip is greater, preferably by at least a factor of two, than the area of the contact surface between the adhesive mass and the glass sheet.

According to one feature of the invention, the region of the metal edge strip in contact with the adhesive mass is furnished with apertures, notches, grooves, channels or hollows to increase the metal surface area of the side of the edge strip which faces the glass, thus, the side which contacts the adhesive mass.

The amount of contact surface area between the adhesive and the metal is decisive in achieving increased adhesion, but also brings additional advantages. Grooves or channels in the holding element not only improve adhesion but also provide a mechanical anchor between the adhesive material and the holding element. The anchor means, therefore, is form-locking during the period prior to setting when adhesion may be reduced. Further, the manner in which the surface of the holding element is increased in the adhesion region leads to increased plastic deformability of the element in said region, which improves the conformation of said element to the contour of the glass surface in the course of the adhesive bonding. Additionally, the consequent increase in the volume of the adhesive mass employed results in increased elasticity of the adhesive bond, which is particularly advantageous because of the continuous vibrations to which such bonds are subjected in vehicles. Finally, the grooves, channels and apertures furnished in the holding element improve the bonding mechanically, due to penetration of the adhesive into the configurational features, to the extent that, according to an advantageous embodiment of the invention, the holding element or holding edge strip is furnished with perforations on its region which contacts the adhesive, said perforations permit contact between the adhesive mass and the surrounding atmosphere. This embodiment is of particular significance in accelerating the setting of the adhesive.

Finally, it will be easily recognized that this invention is not limited to metal edge strips, and that it is useful with any edge strips comprising materials towards which good glass adhesives display a lower degree of adhesion.

BRIEF DESCRIPTION OF THE DRAWINGS

Other particularly advantageous embodiments or variants of the invention will be apparent from the following description in relation to FIGS. 1 to 5, all of which figures are partial cross-sections shown in perspective.

DETAILED DESCRIPTION OF THE PREFERRED EMBODIMENTS

The glass sheet 1 is a generally convex curved sheet of tempered glass intended to serve as a sliding window for an automobile door. The outer surface 2 of the sheet should appear to be even with the automobile body, and should not project beyond the adjacent parts of the body. For the purpose of holding the window even with the body, edge strips, generally of metal, for holding or guiding the glass sheet of the window, are applied to the surface 3 of the glass sheet 1, namely the surface facing the interior of the automobile body, i.e., the passenger compartment, along the regions of the vertical edges 4. These guiding edge strips comprise tongue members for mounting, which tongue members are disposed behind the surface 3 of the glass sheet and are directed toward the window frame. The tongue members cooperate with corresponding edge strips for holding or guiding which are disposed in the window frame itself, in such a way that the window frame edge strips do not extend over the exterior surface 2 of the glass sheet.

According to the invention, the holding or guiding edge strips are adhesively bonded to the surface 3 of the glass sheet 1 by adhesives and as a rule the adhesives employed have a high adhesion to glass. In particular, such adhesive materials are known which are based on polyurethane and comprise a component which sets under the influence of the humidity of the air. For examples of descriptions of such adhesives see U.S. Pat. No. 3,779,794. When these adhesives are applied over an appropriate adhesive primer previously applied, the adhesion to the glass is much superior to the adhesion to any of the metals commonly used for the edge strips employed for holding and guiding.

Figure 1:
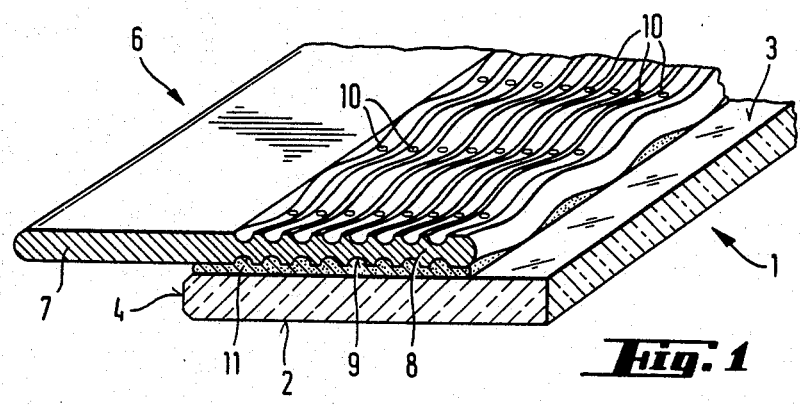
FIG. 1 illustrates a sliding glass window for a car door, comprising a planar holding strip on the edge border of the glass, which strip projects laterally.

In the embodiment illustrated in FIG. 1, the edge strip 6 for guiding, which strip is adhesively bonded to the glass sheet 1, is of a generally planar shape comprising two regions, 7 and 8, having different configurations. The region 7 comprises the actual holding member, and its surfaces are planar. The region 8 is the region which is adhesively bonded to the surface 3 of the glass sheet. In the longitudinal direction it has the profile of a corrugated sheet. This configuration of region 8 enables the edge strip 6 to adapt easily to the curvature of a curved glass sheet. The surfaces of region 8 are also furnished with longitudinal grooves or channels (fluting) and with perforations 10. The configuration of the fluting is such that the surface area of region 8 which comes into contact with the adhesive 11 is at least twice that of the surface region of the glass sheet 1 covered by adhesive. The perforations 10 provide a supplementary anchorage for the adhesive mass 11 in region 8. Region 8 of the edge strip 6, which edge strip is for guiding, is also fluted on the surface of region 8 facing away from the glass, but obviously this fluting is not essential, and the object of the invention is achieved if only the surface in contact with the adhesive 11 is fluted.

Figure 2:
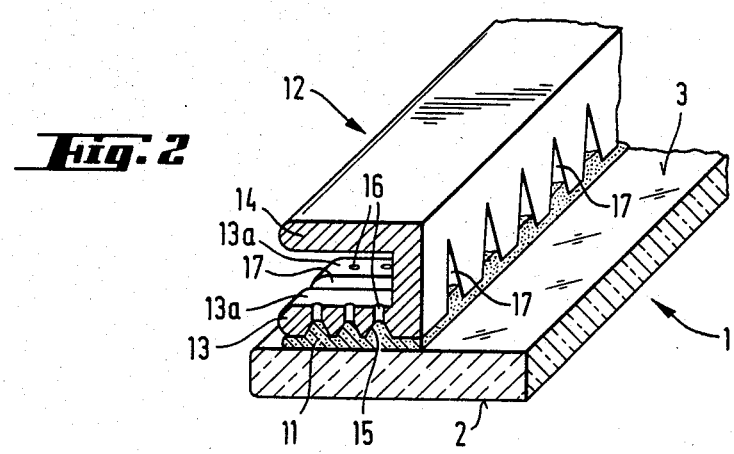
FIG. 2 illustrates a sliding glass window for a car door, comprising a holding rod, having a cross-sectional U-shape disposed on its side.

FIG. 2 illustrates an edge strip 12 for holding or guiding which comprises a U-shape cross-section which the leg of which (or flange) 13 is adhesively bonded to the surface of the glass sheet 1, and the leg 14 serves as a mounting projection which is grasped, i.e., engaged, on the back side of the glass by a holding edge-strip disposed in the window frame. The leg 13 of U-shape edge strip 12 is comprised of segments 13a separated by gaps 17. These gaps emerge in the web of the U in the form of V-shaped notches. The particular configuration of edge strip 12 lends it high deformability so as to be easily adaptable to the contour of a curved glass sheet.

The outer face of leg 13 is furnished with longitudinal grooves 15, the length and possibly the depth of which is chosen such that the surface which contacts the adhesive 11 will have nearly twice the area of the upper plane face of leg 13. Leg 13 is also furnished with a large number of perforations 16. The adhesive 11 partially penetrates into these perforations so as to increase adhesion and to produce a supplementary anchorage at the first stage of assembly, i.e., application of the adhesive to the metal edge-strip. In particular, the perforations serve to promote diffusion of water vapor molecules of the atmospheric air to the adhesive, whereby the setting time of a humidity-settable adhesive is decreased.

Figure 3:
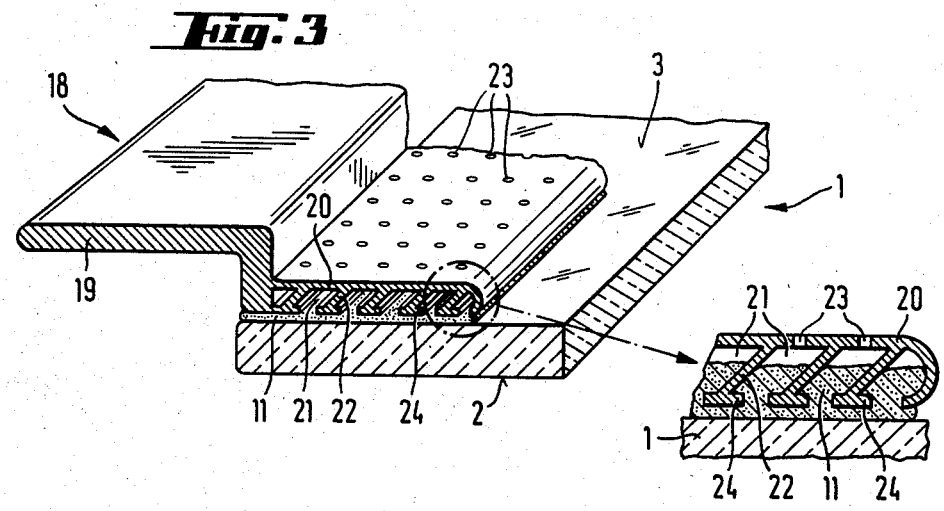
FIG. 3 illustrates the same type of glass window but with a Z-shape holding rod.

The edge strip illustrated in FIG. 3 comprises a Z-shape of which the projecting leg 19 serves as the holding member proper, and the leg 20 is adhesively bonded to the surface 3 of the glass sheet 1 by the intermediate of adhesive mass 11. Leg 20 has a hollowed structure, in particular or, for example, a series of longitudinal channels or grooves 21, and partitions 22 having a T profile, said channel and partition features being disposed on the side of leg 20 directed toward the glass surface. The adhesive 11 penetrates between the partitions 22 into channels 21. The channels communicate with the atmospheric air via perforations 23. The lateral legs 24 of the partitions 22 serve for anchorage, providing for particularly good adhesion of the adhesive mass 11 in the channels 21.

Figure 4:
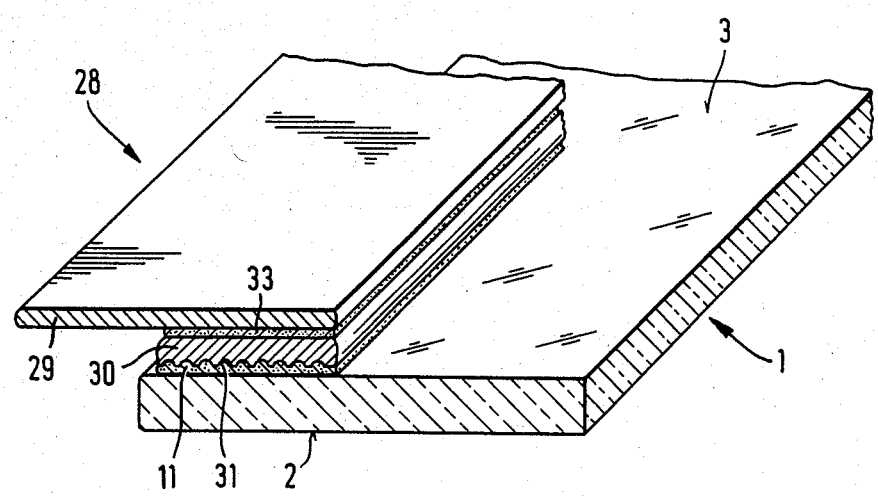
FIGS. 4 and 5 illustrate two other embodiments wherein intermediate pieces are disposed between the glass sheet and the holding rod proper.

FIG. 4 illustrates a two-part edge strip 28. One planar part 29 comprises the holding edge-strip proper, and the other part 30, also generally planar, serves as a linking element between the surface 3 of the glass and the planar part 29. Part 30 is furnished with longitudinal grooves 31 on the surface thereof which is bonded to the glass sheet 1. The grooves serve to increase the active surface area. Part 30 is expediently bonded to the glass sheet 1 at the glass fabrication facility, with the aid of the adhesive 11, which may be a polyurethane-based material comprising a component which sets under the action of the humidity in the air. Part 30 may also be furnished with apertures or perforations which serve to speed the assembly process.

The planar part 29 may be adhesively bonded to the intermediate part 30 by means of an adhesive 33. This operation may expediently be performed at the vehicle manufacturing facility. The composition of adhesive 33 is different from that of adhesive 11, the former being chosen to be compatible with the metal of which parts 29 and 30 are comprised. Alternatively, the two parts 29 and 30 may be joined together by other means such as, for example, welding, brazing or soldering.

Figure 5:
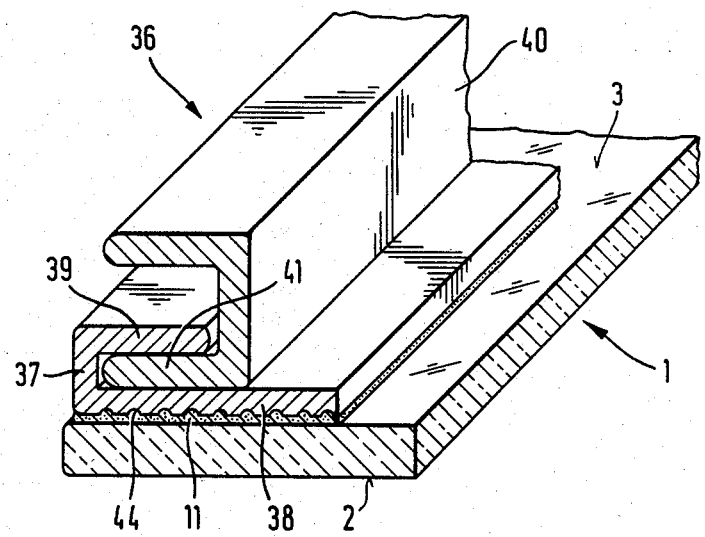

The embodiment illustrated in FIG. 5 is also in the form of a two-part edge strip for holding part 40, both parts having U-shaped cross-sections. One of the legs 38 of part 37 is adhesively bonded to the surface 3 of the glass sheet 1 by an adhesive material 11. The distance between the two legs 38 and 39 of the U of part 37 corresponds to the thickness of a leg 41 of part 40. Leg 41 is joined to shape 37 by simple interlocking engagement and crimping. The part 37 may expediently be attached to the surface 3 of the glass sheet at the glass fabrication facility. This is done, for example, by means of an adhesive material 11. In order to increase the adhesion of the adhesive mass 11 to the U-shape 37, leg 38 of shape 37 is provided with longitudinal grooves 44. Later, in the vehicle manufacturing facility, U-shape 40 can be forced into interlocking engagement with U-shape 37.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A glass sheet assembly, comprising a glass sheet and a metal edge strip adhesively attached to the said glass sheet, said metal edge strip comprising a leg having a contact surface opposite a contact surface of the said glass sheet, said glass sheet assembly further comprising an adhesive having a strong adhesion to glass and wherein the said leg contact surface with the said adhesive is greater than said glass sheet contact surface with the said adhesive.

2. The glass sheet assembly of claim 1 wherein said leg contact surface is greater than said glass sheet contact surface by at least a factor of 2.

3. The glass sheet assembly of claim 2 wherein said leg strip comprises indentations.

4. The glass sheet assembly of claim 3 wherein said indentations comprise apertures, notches, grooves, channels or hollows.

5. The glass sheet assembly of claim 2 wherein the surface of said leg which is not in contact with the said adhesive has perforations which promote contact between the adhesive and the surrounding atmosphere.

6. The glass sheet assembly of claim 5 wherein said leg comprises partition members, each partition member comprising a lateral member.

7. The glass sheet assembly of claim 6 wherein said lateral member serves as an anchoring element in said adhesive.

8. The glass sheet assembly of claim 2 wherein the said leg exhibits plastic deformability.

9. The glass sheet assembly of claim 2 wherein said adhesive comprises a humidity settable polyurethane.

10. The glass sheet assembly of claim 2 wherein the edge strip comprises a first part which includes said leg and a second part engageable or bonded with said first part for holding said first part.

11. The glass sheet assembly of claim 10 wherein the first part is bonded to the second part by adhesive bonding, welding, brazing or soldering.

12. The glass sheet assembly of claim 10 wherein both said first part and said second part have a U-shaped cross-section.

13. The glass sheet assembly of claim 12 wherein said second part is engageably clamped by said first part.

14. The glass sheet assembly of claim 2 wherein said glass sheet assembly is adapted for use in an automobile.

15. The glass sheet assembly of claim 2 wherein said edge strip has a U-shaped cross-section.

16. The glass sheet assembly of claim 2 wherein said edge strip is essentially planar before application to said glass sheet.

17. The glass sheet assembly of claim 2 wherein said edge strip has a Z-shaped cross-section.

* * * * *